Figure 8:
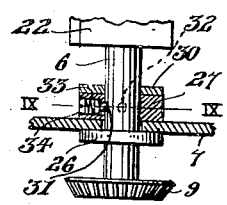

F. SKARZYNSKI.
DIRECTION INDICATOR FOR MOTOR VEHICLES.
APPLICATION FILED OCT. 20, 1921.

1,422,005.

Patented July 4, 1922.

Inventor
F. Skarzynski

By J. C. Bryant.
Attorney

UNITED STATES PATENT OFFICE.

FRANK SKARZYNSKI, OF ROCHESTER, NEW YORK.

DIRECTION INDICATOR FOR MOTOR VEHICLES.

1,422,005.

Specification of Letters Patent.

Patented July 4, 1922.

Application filed October 20, 1921. Serial No. 509,007.

*To all whom it may concern:*

Be it known that I, FRANK SKARZYNSKI, a citizen of the United States of America, residing at Rochester, in the county of Monroe and State of New York, have invented certain new and useful Improvements in Direction Indicators for Motor Vehicles, of which the following is a specification.

This invention relates to certain new and useful improvements in direction indicators for motor vehicles, particularly of the manually operable type involving a pointer or hand rotatably mounted upon a vertical axis.

The primary object of the invention is to provide a direction indicator for motor vehicles involving a rotatably vertical operating shaft having an indicator hand or pointer fixed upon the upper end thereof and provided with means operatively connected with the lower end of the same for rotating said shaft and pointer, said shaft being journaled through a suitable support and having a bearing provided with means for preventing accidental rotary displacement of the hand or pointer when in any of its adjusting indicating positions while permitting ready rotation of the same manually.

With the above general object in view and others that will appear as the nature of the invention is better understood, the same consists in the novel form, combination and arrangement of parts hereinafter more fully described in connection with the accompanying drawing and in which like characters of reference indicate corresponding parts throughout the several views.

Figure 1:
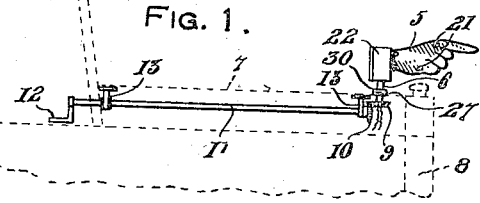
Figure 9:
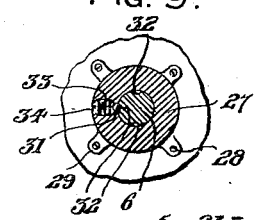
Figure 2:
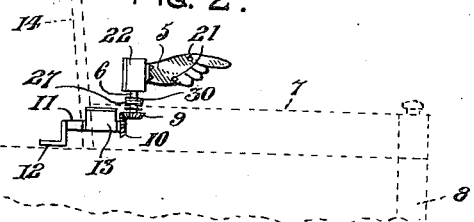
Figure 3:
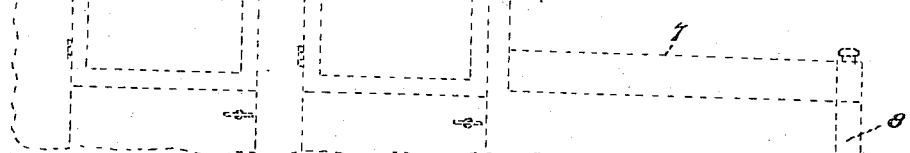
Figure 4:
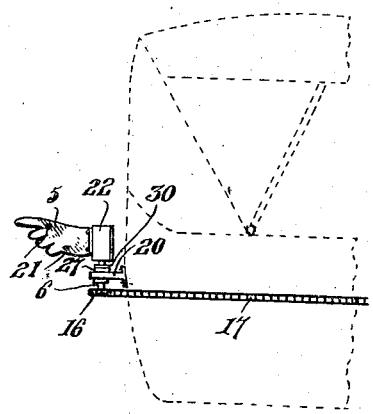
Figure 5:
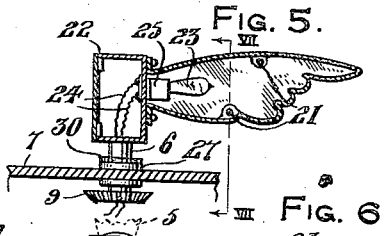
Figures 6, 7:
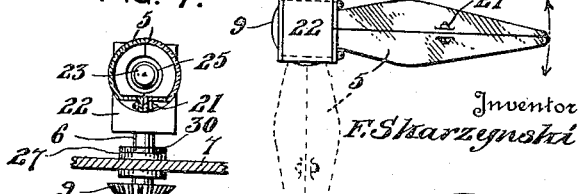

In the drawing,

Figure 1 is a side elevational view of a direction indicator constructed in accordance with the present invention shown operatively disposed upon a motor vehicle, a portion of which is indicated in outline by dotted lines, Figure 2 is a view somewhat similar to Figure 1 showing a modified form of the indicator, Figure 3 is a view similar to Figures 1 and 2 of a further modification, Figure 4 is a view similar to Figure 3 of a still further modification, Figure 5 is a view partly in vertical section and partly in side elevation of the indicator and its operating shaft together with associated parts, Figure 6 is a top plan view of the device shown in Figure 1 with the hand or pointer shown in two positions by dotted lines, the hand being broken away in one of said dotted line positions, Figure 7 is a vertical sectional view taken upon line VII—VII of Figure 5, Figure 8 is an enlarged fragmentary view partly in vertical section and partly in elevation of the device shown in Figure 5, and Figure 9 is a horizontal sectional view taken substantially upon line IX—IX of Figure 8.

Referring to Figure 1, the invention embodies a hand or pointer 5 fixed upon the upper end of a vertical operating shaft 6 which is journaled through the top wall of the engine hood 7 near the radiator 8, a bevel gear 9 being fixed upon the lower end of the shaft 6 in mesh with another bevel gear 10 fixed upon the forward end of a relatively long horizontal shaft 11 which extends rearwardly under the hood 7 and through the dash of the automobile so that the shaft 11 may be readily manually rotated by means of a handle 12 fixed upon the rear end of the shaft 11. Suitable shaft hangers 13 may be fixed to the under side of the hood 7 for rotatably supporting the shaft 11. In Figure 2, the hand or pointer 5 is mounted upon the upper end of the shaft 6 and has a supporting gear 9 fixed upon the lower end of said shaft meshing with another bevel gear 10 fixed upon a horizontal relatively short shaft 11, the rear end of which is within reach of the driver and has an operating handle 12. In this form of the invention, the construction is substantially the same as in Figure 1 except that the shaft 11 is shorter and the shaft 6 is journaled through the hood 7 near the windshield 14 instead of near the radiator 8. The shaft 11 is supported by a shaft hanger 13 fixed to the hood 7.

In Figure 3, the signal is shown and adapted for the closed car type of automobile with the vertical shaft 6 journaled through the top 15 of the automobile body, an indicator hand or pointer 5 being fixed upon the upper end of the shaft 6 and a sprocket wheel 16 being fixed upon the lower end of the shaft 6 in lieu of the bevel gears 9 of the forms shown in Figures 1 and 2. The sprocket wheel 16 has an endless chain 17 passed therearound and this chain extends forwardly and around another sprocket wheel 18 that is suitably journaled in the same horizontal plane as the sprocket wheel 16 at the forward end of the top 15 and which is provided with a depending handle 19 within convenient reach of the driver for rotating the sprocket wheel 18.

Referring to Figure 4, the construction is substantially the same as that shown in Figure 3, the hand 5 being mounted upon the vertical shaft 6 which is provided with a sprocket wheel 16 at its lower end engaged by an endless sprocket chain 17, but in this form the shaft 6 is journaled through a bracket or like support 20 fixed to the rear of the automobile body near one side and the chain 17 extends forwardly so that the same may be manipulated in any desired manner from the driver's seat.

As shown in Figures 5, 6, and 7, the indicating pointer 5 preferably consists in a pair of molded longitudinal half sections suitably bolted together as at 21 and having base flanges by means of which said sections may be fastened to a rectangular housing 22 which is mounted upon the upper end of the shaft 6. The hand 5 being of hollow construction and of transparent material, is adapted to be interiorly illuminated by an electric lamp 23 whose feed wires 24 extend into the housing 22 and downwardly through the shaft 6 to a desired point of current supply and control switch, not shown. The arrangement of the switch and battery is incidental and well known in the art so that the same forms no part of the present invention and is therefore not shown. The construction is preferably such that the wrist portion of the indicator hand 5, is opened at the end so as to admit the entrance of the bulb 23 which is preferably engaged with the usual lamp socket 25 fixed upon the outer face of one side of the casing 22 and connected with the wires 24.

In each of the forms of the invention shown in Figures 1, 2, 3, and 4, the shaft 6 extends through the support 7, 15, or 20 and is held against endwise displacement and in adjusted rotarily swung position by means of the construction clearly shown in Figures 8 and 9. This construction includes a flange or collar 26 fixed upon the shaft 6 and positioned to engage the under surface of the support, a bearing 27 fastened upon the upper surface of the support and through which the shaft 6 rotatably extends, said bearing being held against rotation by means of screws 28 entering apertures in a plurality of radial ears 29 upon said bearing 27 and engaging the support, and another flange or collar 30 fastened to the shaft 6 in position to rest upon the upper surface of the bearing 27. The flanges 26 and 30 will prevent endwise movement of the shaft 6 and the bearing 27 is provided with a radial inwardly pressed ball 31 adapted to selectively engage one of three hemi-spherical sockets 32 provided in the periphery of the shaft 6 for holding the latter and the indicating hand or pointer in a position extending straight ahead or extending to the right or to the left. A spring 33 is preferably provided in a socket of the bearing 27 for yieldingly forcing the ball 31 inwardly and its tension may be regulated by a screw plug 34 screwed into the outer end of said socket.

In operation, through the mechanism and gearing described, the shaft 6 of any of the forms may be rotated in the proper direction to turn the indicating hand to the right in case the driver is about to turn in that direction while by rotating the shaft 6 in the opposite direction, said hand will be caused to point to the left to indicate that the driver is about to turn in the latter direction. On the other hand, the pointer will be directed straight ahead when the driver intends to continue a straight course. In any one of these three positions, the ball 31 is engaged in one of the sockets 32 so as to prevent accidental rotation of the pointer from vibration, wind pressure or the like, but at the same time manual rotation of the shaft and its pointer will be possible. Obviously, the lamp 23 need not be lighted during the daytime but will be found necessary at night in order that the signal may be plainly visible at all times.

From the foregoing description, it is believed that the construction and operation of the present invention will be readily understood and appreciated by those skilled in the art.

Minor changes may be made without departing from the spirit and scope of the invention as claimed.

What is claimed as new is:

1. In a direction indicator for motor vehicles, a vertical shaft journaled for rotation and having a housing fixed upon the upper end thereof, a lamp socket mounted upon the exterior of one of the side walls of said housing and having an incandescent lamp therein, feed wires for said socket extending through the housing and shaft, means operatively connected to the lower end of the shaft for manually rotating the latter, and a hollow transparent indicator member having a flanged wrist portion secured against said side of the housing and having an open end into which the lamp and socket project.

2. In a direction indicator for motor vehicles, a vertical shaft journaled for rotation and having a housing fixed upon the upper end thereof, a lamp socket mounted upon the exterior of one of the side walls of said housing and having an incandescent lamp therein, feed wires for said socket extending through the housing and shaft, means operatively connected to the lower end of the shaft for manually rotating the latter, and a hollow transparent indicator member having a flanged wrist portion secured against said side of the housing and having an open end into which the lamp and socket project, said indicator member comprising longitudinal half sections bolted together.

3. In a direction indicator for motor vehicles, a horizontal support, a vertical shaft extending and journaled therethrough, a bearing through which the shaft extends resting upon said support and fixed to the latter against rotary movement, a flange fixed to the shaft and rotarily engaging the under surface of the support, a second flange fixed to the shaft and rotarily engaging the upper surface of the bearing, an indicator member mounted upon the upper end of the shaft, means to manually rotate said shaft operatively connected to the lower end of the latter, and means including a spring pressed detent carried by the bearing for holding the shaft against accidental rotation when the pointer is directed ahead, to the left or to the right, said last named means permitting ready manual rotation of the shaft.

4. In a direction indicator for motor vehicles, a vertical shaft journaled for rotation and having a housing fixed upon the upper end thereof, a hollow transparent indicator member having a flanged wrist portion secured against one side of the housing, said indicator member comprising longitudinal half sections bolted together, and means for rotating said shaft and indicator member.

In testimony whereof I affix my signature.

FRANK SKARZYNSKI.